Dec. 20, 1966 TAKAYOSHI SATO ETAL 3,292,516
PHOTOGRAPHIC CAMERA WITH AUTOMATIC EXPOSURE CONTROL
Filed May 12, 1964 3 Sheets-Sheet 1

United States Patent Office 3,292,516
Patented Dec. 20, 1966

3,292,516
PHOTOGRAPHIC CAMERA WITH AUTOMATIC
EXPOSURE CONTROL
Takayoshi Sato, Itabashi-ku, Tokyo-to, and Tomio
Kikuchi, Toshima-ku, Tokyo-to, Japan, assignors to
Kabushiki Kaisha Copal, Tokyo-to, Japan
Filed May 12, 1964, Ser. No. 366,807
Claims priority, application Japan, May 17, 1963,
38/25,945
3 Claims. (Cl. 95—10)

The present invention relates to photographic automatic cameras of the type capable of automatically determining the exposure time by the presetting of the diaphragm aperture and more particularly to photographic cameras capable of adjusting diaphragm aperture and exposure time by means of an electronic device.

In conventional cameras in which the exposure time is automatically adjusted by presetting the diaphragm aperture, since the measuring part of an exposure meter installed in the camera and a mechanical delaying device (slow-governor) are interrelatedly coupled, the exposure meter must be disposed at a position near the exposure time setting mechanism, thus causing a considerable limitation in the design of the camera. On one hand, the exposure meter as described above is required to be of small type and precise because of its installation in the camera, but manufacturing of such exposure meters is difficult due to the inequality of the materials forming the exposure meter. Furthermore, destruction and erroneous measurement are liable to occur due to extraneous and internal shocks, and such installation has been a major cause of defective operation or failure in such cameras.

Furthermore, in conventional cameras of the above-mentioned type, there is a disadvantage in that when the diaphragm blades are adjusted by the diaphragm adjusting mechanism so as to be matched to a previously preset diaphragm aperture, overexposure or underexposure will occur when an appropriate exposure time adapted to the set diaphragm aperture cannot be obtained within the exposure time adjusting range of the camera. For avoiding said disadvantage, there has been proposed a camera which is constructed so that when an appropriate exposure time cannot be obtained as in the above-mentioned situation, the shutter cannot be released.

An object of the present invention is to eliminate the abovementioned disadvantage of conventional automatic cameras.

A further object of this invention is to provide a photographic automatic camera of the type as described above, in which an exposure meter is not necessary.

Another object of this invention is to provide a photographic automatic camera of the type as described above, in which the photographing can be always achieved in the most appropriate exposure condition.

The above objects and other objects of this invention have been attained by a camera comprising an electronic device inclding a photo-conductor, transistors, a capacitor, and resistors and a photo-adjusting device capable of adjusting the quantity of the light received by the photo-conductor while said device is being coupled with a diaphragm adjusting mechanism, said electronic device and photo-adjusting device being interrelated so that after said diaphragm adjusting mechanism has been adjusted to a position adapted to obtain a required diaphragm aperture, said electronic device controls the operation time of an electromagnet which controls the exposure time in response to the quantity of the light projected from the object onto the photo-conductor, thus actuating the shutter.

Since the present electronic device operates an exposure time controlling electromagnet in response to incident light quantity of the photo-conductor, exposure for a long period of time can be made possible even when the incident light quantity is very small, and underexposure photographing cannot occur. However, high speed photographing is necessarily limited by the operation resistance of the shutter actuating mechanism and the operation delay of the electronic device. For avoiding said limitation, the diaphragm adjusting mechanism is constructed so that said mechanism is actuated in response to camera release until it is brought to the position preset previously by the diaphragm setting member in accordance with the release of the camera, and, a diaphragm controlling electromagnet is provided in the electronic device, said electromagnet being constructed so that when the incident light quantity of the photo-conductor is very large, said diaphragm adjusting mechanism being locked by said electromagnet prior to the arrival of said mechanism at its preset position, and after locking of said mechanism, the exposure time is adjusted as previously described, whereby the shutter is actuated. According to the present camera photographing under unfavorable exposure cannot be carried out and the shutter release is always correct.

The nature and details of the invention as well as the manner in which the foregoing objects may best be achieved will be more clearly apparent by reference to the following description of particular embodiments of the invention taken in connection with the accompanying drawings in which like parts are designated by like reference numerals, and in which.

Figure 1:
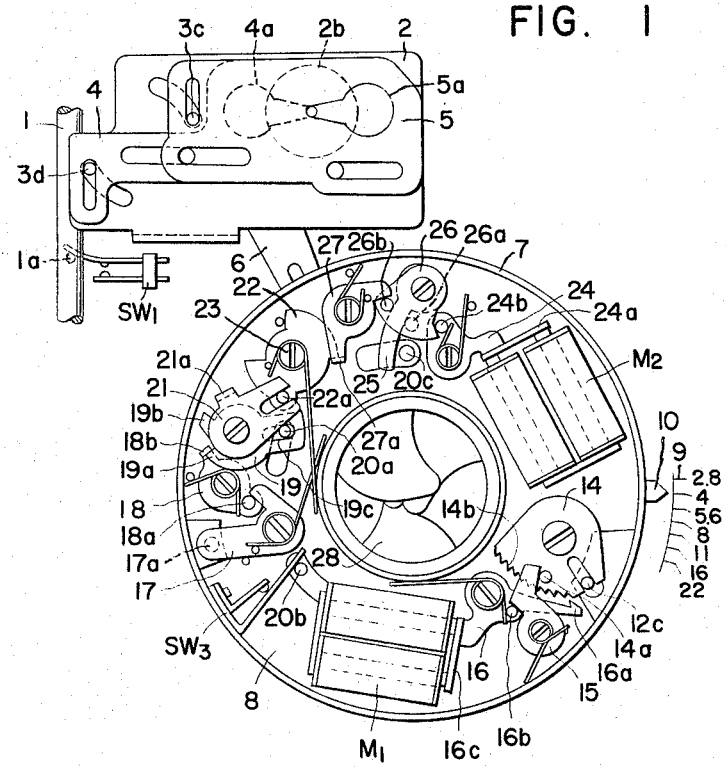
FIG. 1 is a front view showing an example of this invention.
Figure 3:
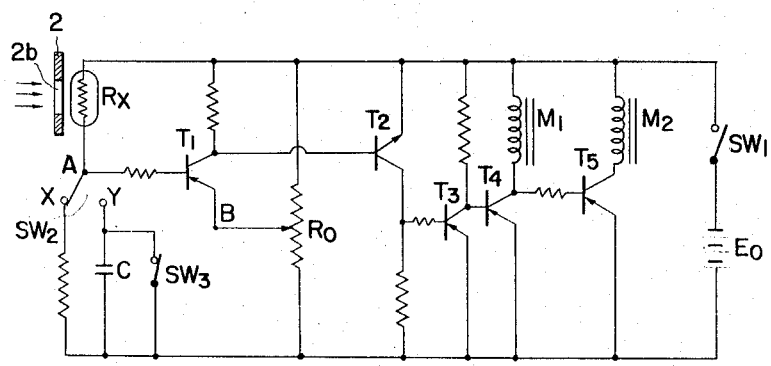
FIG. 3 is a circuit diagram showing an electronic device used in the embodiment shown in FIGS. 1 and 2.
Figure 2:
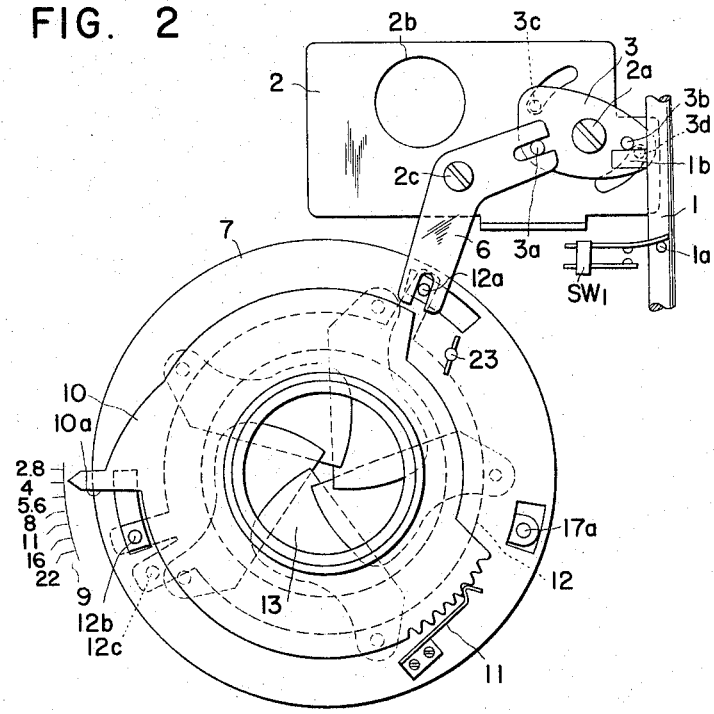
FIG. 2 is a rear view of the arrangement shown in FIG. 1.

Referring to FIGS. 1 to 3, a release bar 1 capable of being urged down by a release button against the force of a restoring spring is provided with a pin 1a which holds a switch $SW_1$ inserted in the electric circuit (FIG. 3) in its opened condition when said bar 1 is not pushed down. However, the pin 1a detaches from the switch $SW_1$ in the initial course of said down-motion of said release bar 1, whereby said switch is closed. An actuating disc 3 which is pivoted at a pivotal shaft 2a of a base plate 2 fixed to the camera casing is provided with pins 3a, 3b, 3c, and 3d and is being urged clockwise as viewed in FIG. 2 by means of a spring (not shown), but said disc is prevented from rotating by a projection 1b (FIG. 2) of the release bar 1 when the camera release is not operated and takes the position as shown in FIG. 2. Control plates 4 and 5 are respectively provided with holes 4a and 5a adapted to control the light projected, through an aperture 2b of the base plate 2 to a photo-conductor $R_x$ (FIG. 3) from an object and are slid in mutually opposite directions through pins 3c and 3d by the rotation of said actuating disc 3.

To the rear part of the shutter housing 7 is attached a diaphragm presetting ring 10 adapted to set the diaphragm aperture to a desired value corresponding to diaphragm graduation 9. This ring 10 is rotated by hand and then is fixed at a predetermined position by means of a clip 11. A diaphragm adjusting ring 12 provided between the housing 7 and base plate 8 is provided with diaphragm blades 13 pivoted thereto so that when said ring 12 is rotated clockwise, the diaphragm aperture is increased. The ring 12 is provided with pins 12a, 12b and 12c attached thereto, said pins 12a and 12b being made to extend toward the rear surface of the housing 7 and said pin 12c to extend toward the front surface of the plate 8. A connecting lever 6 pivoted at a pivotal shaft 2c of the base plate 2 is provided at both ends with respective slots to which pins 3a and 12a are respectively engaged, whereby the actuating disc 3 and diaphragm adjusting ring 12 are operably coupled. Clockwise movement of the diaphragm adjusting ring 12 as shown in FIG. 2 is stopped upon the pin 12b abutting against the end surface 10a of the diaphragm setting ring 10. A disc 14 having a pin 14a and teeth 14b and pivoted to plate 8 is coupled with the diaphragm adjusting ring by engagement between a pin and a slot. An intermediate lever 15 is urged in the clockwise direction by a weak spring so as to be in contact with a pin 14a thereby following the counterclockwise movement of the disc 14. A lock-lever 16 urged counterclockwise by a spring is provided with a lock member 16a engaged with the teeth 14b of the disc 14 and a pin 16 in contact with the intermediate lever 15. A bent member 16c of the lock-lever 16 is attracted by a diaphragm controlling electromagnet $M_1$ when it is excited, whereby the lock-lever 16 is rotated clockwise against a spring. A release lever 17 having a pin 17a is rotated clockwise against the force of a spring by means of the release bar 1 after the diaphragm adjusting mechanism has been controlled. A latch lever 18 is provided with a pin 18a in contact with the release lever 17 and a bent member 18b and is rotated counterclockwise by its spring upon clockwise rotation of the release lever 17. A first shutter actuating disc 19 having projections 19a, 19b and a slot 19c and pivoted to the plate 8 is engaged at said slot 19c with a pin 20a of a sector ring (not shown). In the cocked state of the shutter as shown in FIG. 1, clockwise rotation of said shutter actuating disc 19 is locked by means of the bent member 18b of the latch lever 18. A second shutter actuating disc 21 is pivoted at the same pivotal shaft as that of the first shutter actuating disc 19 and has a bent member 21a capable of contacting the projection 19b. The first and second shutter actuating discs 19 and 21 are connected by a spring (not shown), whereby said discs 19 and 21 are respectively urged in clockwise and counterclockwise directions. A driving disc 22 fixed to a shaft 23 extending toward the rear side of the housing is rotated counterclockwise relative to a film winding mechanism (not shown) at the time of shutter cocking and is moved clockwise by a driving spring when the shutter is released, thus causing the second actuating disc 21 to be rotated counterclockwise by the pin 22a.

When the first actuating disc 19 is rotated clockwise, the pin 20b of the sector ring is rotated counterclockwise with respect to the optical axis whereby a switch $SW_3$ is opened. A lever 24 having a pin 24b and a bent member 24a capable of being attracted by the electromagnet $M_2$ is pivoted on the plate 8 so as to be urged counterclockwise by a spring. A lever 26 abutted on the pin 24b is provided with pins 26a and 26b and a lever 25 pivoted on the same pivotal shaft as that of the lever 26 is urged counterclockwise by a spring the force of which is stronger than that of the spring of the lever 24, whereby the lever 25 is caused to be in contact with the pin 26a and pin 20c of the sector ring. A lever 27 in contact with the pin 26b is pivoted on the plate 8 and urged clockwise by a spring weaker than that of the lever 24, whereby said lever 27 locks the clockwise movement of the driving disc 22 by a bent member 27a of said lever. The shutter blades are actuated by a well-known type sector ring (not shown), and said sector ring is provided with pins 20a, 20b, and 20c.

The operation of the embodiment illustrated in FIGS. 1 to 3 is as follows: First, a desired diaphragm aperture is selected at the graduation 9 by manual rotation of the diaphragm setting ring 10. Then, if the release bar 1 is urged down, the switch $SW_1$ will be closed, whereby the electric circuit as shown in FIG. 3 will be made conductive. In this condition, since the light receiving area of the photoconductor $R_x$ is minimum, said area being formed with the holes 4a and 5a of the control plate 4 and 5, the resistance of said photo-conductor $R_x$ is very high, so that the transistors $T_1$, $T_2$, $T_3$, and $T_5$ are cut off, and only the transistor $T_4$ is conductive. As a result, the diaphragm controlling electromagnet $M_1$ is excited and attracts the lock lever 16. Due to the succeeding downward movement of the release bar 1, the actuating disc 3 is rotated clockwise (in FIG. 2) by a spring (not shown), whereby the control plates 4 and 5 are slid so as to spread the holes 4a and 5a, thus increasing the incident light quantity of the photoconductor $R_x$. At the same time as said variation of the incident light quantity of the photo-conductor $R_x$ by the actuating disc 3, the diaphragm adjusting ring 12 is rotated, through the connecting lever 6 by said actuating disc 3 until said ring 12 is locked with end surface 10a of the diaphragm setting ring 10. After the diaphragm aperture has been determined by rotation of the diaphragm adjusting ring 12, the switch $SW_2$ is switched over from the terminal X to the terminal Y in the intermediate course of the downward movement of the release bar 1, whereby the transistors $T_1$, $T_2$, $T_3$, and $T_5$ are made to be conductive, and a transistor $T_4$ is cut off. Consequently, the electromagnet $M_2$ is excited and no current flows through the electromagnet $M_1$. In this condition, the release lever 17 is rotated clockwise at the last part of the downward movement of the release bar 1, whereby the bent member 18b of the latch lever 18 is disengaged from the projection 19a of the first shutter actuating disc 19. As a result, said disc 19 is rotated clockwise by a spring (not shown) stretched between said disc 19 and the second shutter actuating disc 21 and actuates the pin 20a of the sector ring through the slot 19c, thus opening the shutter blades 28. In the course of this opening movement of the shutter blades, the switch $SW_3$ is opened by the pin 20b of the sector ring, whereby the exposure time delaying circuit of the shutter is triggered. When the potential polarities of the points A and B (FIG. 3) are reversed after a delay time corresponding to the incident light quantity of the photo-conductor $R_x$ has been established, the transistors $T_1$, $T_2$, $T_3$, and $T_5$ are cut off, and the transistor $T_4$ becomes conductive, so that current flowing through the electromagnet $M_2$ is arrested. On one hand, since the lever 25 has been rotated clockwise by the pin 20c in the course of the shutter opening movement, the lever 24 is rotated counterclockwise by its own spring when the current flowing through the electromagnet $M_2$ is stopped and causes the lever 27 to rotate counterclockwise through the lever 26, thus enabling rotation of the driving disc 22. Accordingly, the second shutter actuating disc 21 is rotated counterclockwise the pin 22a, and the bent member 21a of said disc pushes the projection 19b, whereby the first shutter actuating disc 19 is rotated counterclockwise and the shutter blades 28 are closed.

Consequently, the exposed time is equal to the delay time determined by the capacitance of the capacitor C and the resistance value of the photoconductor $R_x$, said resistance value corresponding to the brightness of the object, that is, the time between the instant when the switch $SW_3$ commences to open and the instant when the transistors are reversed again. On the other hand, the photo-conductor $R_x$ is initially connected to a stationary resistor on the side of terminal X by the action of the switch $SW_2$ so that when the object to be photographed is very bright the resistance value of the photoconductor becomes sufficiently low before the diaphragm aperture reaches a preset value in the course of opening of said aperture from minimum to maximum value, whereby the transistor $T_1$ is reversed from the cut-off state to the conductive state thus stopping the diaphragm aperture at its position. At this time, if the resistor $R_0$ is disregarded, the resistance value of the photo-conductor $R_x$ corresponds to a certain predetermined value established by the stationary resistance on the side of terminal X. Consequently, reversion of the transistor $T_1$ prior to reaching the diaphragm aperture to its preset value occurs in the case where the resistance value of the photoconductor $R_x$ reaches a certain predetermined value, so that when the switch $SW_2$ is exchanged from the terminal X to the capacitor C of the terminal Y, a certain predetermined shutter speed, that is, exposure time, is always obtained. The resistance value of the above-mentioned stationary resistance is selected so that when the transistor $T_1$ is reversed prior to reaching of the diaphragm aperture from minimum value to preset value, the exposure time becomes minimum.

In the abovementioned embodiment, when the diaphragm adjusting ring 12 is brought to the appropriate diaphragm aperture position corresponding to the minimum exposure time prior to the stopping of said ring 12 at the end surface 10a of the diaphragm setting ring 10, the potential polarities of the points A and B (FIG. 3) are reversed, and the transistors $T_1$, $T_2$, $T_3$, and $T_5$ are made to be conductive and, only the transistor $T_4$ is cut off. As a result, the current flowing through the electromagnet $M_1$ is cut off, and the lock lever 16 is moved counterclockwise by a spring, whereby the lock part 16a of the lever 16 engages with the teeth 14b of the disc 14, thus stopping the movement of the diaphragm adjusting mechanism.

Figure 5:
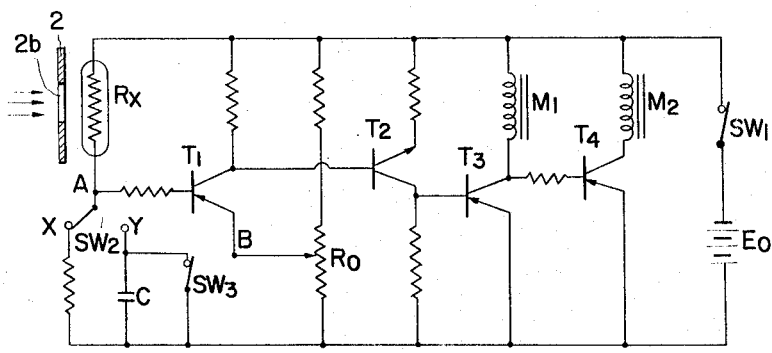
FIG. 5 is a circuit diagram showing an electronic device used in the embodiment of FIG. 4.
Figure 4:
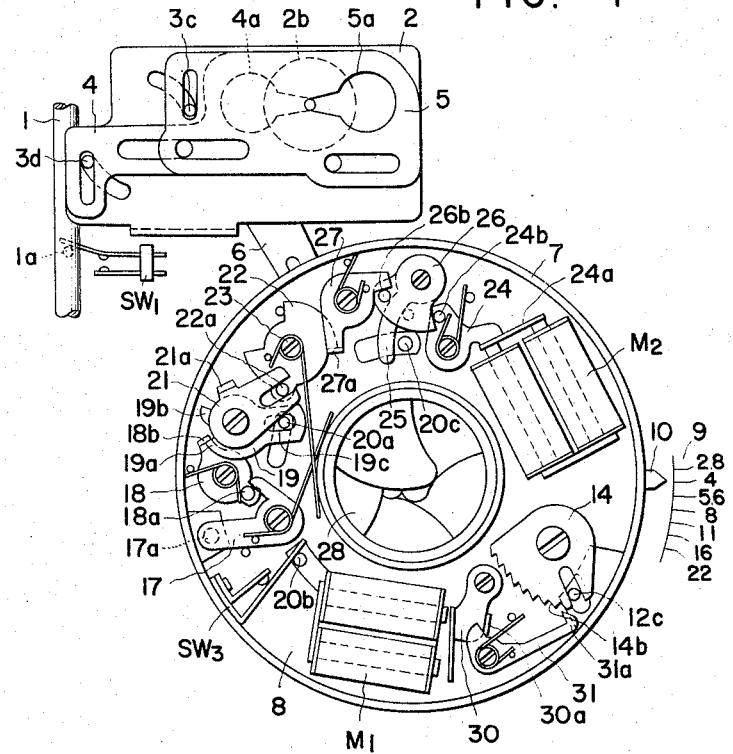
FIG. 4 is a front view corresponding to FIG. 1 and ilustrating another embodiment of this invention.

The embodiment of FIGS. 1 to 3 relates to a situation in which locking of the diaphragm adjusting mechanism is carried out by cutting off the current flowing through the electromagnet $M_1$, but the embodiment illustrated in FIGS. 4 and 5 relates to a situation in which locking of the diaphragm adjusting mechanism is carried out by causing a current to flow through the electromagnet $M_1$.

The embodiment of FIG. 4 is substantially the same as that of FIGS. 1 to 3 except that a lever 30 is attracted when a current flows through the diaphragm controlling electromagnet $M_1$, and a lock lever 31 is rotated counterclockwise by a bent member 30a of said lever 30 against the force of a spring when said attraction of the lever occurs, thereby locking the movement of the diaphragm adjusting mechanism by means of a block part 31a.

Furthermore, the electronic device shown in FIG. 5 and used in the mechanism of FIG. 4 is substantially the same as that of FIG. 3 except that only four transistors are used.

Operation of the embodiment in FIGS. 4 and 5 is as follows: In a situation where the exposure time is automatically controlled after the diaphragm adjusting ring 12 has been rotated to the position corresponding to a previously set diaphragm aperture, the operation is the same as that of FIGS. 1 to 3. Consequently, description of this operation is omitted herein.

In FIGS. 4 and 5, sliding of the control plates 4 and 5 is caused by the camera shutter release, whereby the light receiving area of the photo-conductor $R_x$ is increased and the diaphragm adjusting ring 12 is rotated by the connecting lever 6 so as to gradually increase the diaphragm aperture. In the course of this increasing of the diaphragm aperture, when the exposure becomes excessive at a certain diaphragm aperture even when photographing is carried out with an exposure time corresponding to maximum speed, the potential polarities of the points A and B in FIG. 5 are reversed prior to the arrival of the diaphragm ring 12 at the preset position, whereby the transistors $T_1$, $T_2$, and $T_3$ become conductive, the transistor $T_4$ is cut off, and a current flows through the diaphragm controlling electromagnet $M_1$, so that the electromagnet $M_1$ attracts the lever 30 and operates the lock lever 31 to lock the disc 14, thus stopping movement of the diaphragm adjusting mechanism. Then, the switch $SW_2$ is switched over from the terminal X to the terminal Y in response to movement of the release bar 1 and the release lever 17 is operated by the release bar 1, whereby actuation of the shutter is carried out as above described.

In both of the embodiments of this invention, the incident light quantity of the photo-conductor $R_x$ is adjusted by using control plates 4 and 5, but said adjustment may be carried out by using an appropriate filter without varying the light receiving area.

Furthermore, the electronic device as illustrated in FIG. 3 may be used in the example of FIG. 4 and vice versa with equal results.

What is claimed is:

1. In a photographic automatic camera of the type capable of automatically controlling the exposure time by the presetting of the diaphragm, an improved combination including: a control device for controlling incident light quantity radiated into a photo-conductor in response to camera release; a diaphragm adjusting mechanism for controlling the diaphragm aperture of the photographing lens from its minimum value to its maximum value in relation to the operation of said control device; a diaphragm presetting member capable of being manually operated to set the diaphragm aperture to a desired value prior to camera release and stopping movement of said diaphragm adjusting mechanism at the set position; an exposure time delaying circuit consisting of electronic device comprising a photo-conductor and a capacitor adapted to obtain an exposure time corresponding to delay time determined by the capacitance value of said capacitor and the resistance value of said photo-conductor, the resistance value corresponding to the brightness of the object to be photographed; an exposure time controlling electromagnet operated by said electronic device in response to the incident light quantity of the photo-conductor to release the shutter for its closing movement; a diaphragm controlling electromagnet operable, when exposure becomes excessive in spite of photographing with the exposure time of maximum speed, by said electronic device at the time when the diaphragm adjusting mechanism is brought, during its movement, to an appropriate diaphragm aperture adjusting position corresponding to the exposure time of maximum speed; and a lock device for locking the movement of the diaphragm adjusting mechanism through the operation of said diaphragm control electromagnet.

2. The photographic automatic camera according to claim 1, in which the diaphragm adjusting mechanism is locked by the locking device when a current is caused to flow through the diaphragm control electromagnet by the operation of the electronic device.

3. The photographic automatic camera according to claim 1, in which the diaphragm adjusting mechanism is locked by the locking device when a current caused by the operation of the electronic device and flowing through the diaphragm control electromagnet is cut off.

References Cited by the Examiner

UNITED STATES PATENTS 3,125,939 3/1964 Bundschuh _____ 95—10
3,148,602 9/1964 Kiper _____ 95—10

JOHN M. HORAN, *Primary Examiner.*